(12) United States Patent  
Takayama

(10) Patent No.: US 7,791,647 B2  
(45) Date of Patent: Sep. 7, 2010

(54) IMAGE CAPTURING APPARATUS WHICH CONVERTS INCIDENT LIGHT TO FIRST ELECTRIC SIGNALS ACCORDING TO A PLURALITY OF PHOTOELECTRONIC CONVERSION CHARACTERISTICS AND IMAGE CAPTURING METHOD

(75) Inventor: Jun Takayama, Tama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 528 days.

(21) Appl. No.: 11/721,659

(22) PCT Filed: Nov. 21, 2005

(86) PCT No.: PCT/JP2005/021347

§ 371 (c)(1),  
(2), (4) Date: Jun. 13, 2007

(87) PCT Pub. No.: WO2006/067926

PCT Pub. Date: Jun. 29, 2006

(65) Prior Publication Data

US 2008/0218617 A1    Sep. 11, 2008

(30) Foreign Application Priority Data

Dec. 20, 2004    (JP) .............................. 2004-367725

(51) Int. Cl.  
*H04N 5/228* (2006.01)

(52) U.S. Cl. .................................................. 348/222.1

(58) Field of Classification Search ........................ None  
See application file for complete search history.

(56) References Cited

U.S. PATENT DOCUMENTS

| 6,414,295 B1 * | 7/2002 | Nakamura ................ 250/208.1 |
| 6,927,884 B2 | 8/2005 | Takada et al. |
| 7,061,529 B2 * | 6/2006 | Nakamura ................ 348/222.1 |
| 7,443,427 B2 * | 10/2008 | Takayanagi ............... 348/223.1 |

FOREIGN PATENT DOCUMENTS

| JP | 8-172356 A | 7/1996 |
| JP | 2001-086402 A | 3/2001 |
| JP | 2001086402 A | * 3/2001 |
| JP | 2002-77733 A | 3/2002 |
| JP | 2004-88312 A1 | 3/2004 |

* cited by examiner

*Primary Examiner*—Justin P Misleh  
(74) *Attorney, Agent, or Firm*—Frishauf, Holtz, Goodman & Chick, P.C.

(57) ABSTRACT

There is described an image capturing apparatus and method, in which the electric signals originated from the logarithmic conversion source are converted into those originated from the linear conversion source and which makes it possible to prevent the apparatus from capsizing. The apparatus includes an image sensor that includes a plurality of pixels to convert incident light to first electric signals according to a plurality of photoelectronic conversion characteristics, based on intensity of the incident light; and a signal processing section to apply signal processing to the first electric signals. The signal processing section has: a linearization section to convert the first electric signals to second electric signals, which represent such electric signals that are linearly converted from the incident light; and a compression section to compress a predetermined range component corresponding to a predetermined signal value range, among the first electric signals outputted from the image sensor.

28 Claims, 8 Drawing Sheets

IMAGE CAPTURING APPARATUS WHICH CONVERTS INCIDENT LIGHT TO FIRST ELECTRIC SIGNALS ACCORDING TO A PLURALITY OF PHOTOELECTRONIC CONVERSION CHARACTERISTICS AND IMAGE CAPTURING METHOD

This application is a U.S. National Phase Application under 35 USC 371 of International Application PCT/JP2005/021347 filed Nov. 21, 2005.

FIELD OF THE INVENTION

The present invention relates to an image capturing apparatus provided with an image sensor to convert incident light to electric signals, and also relates to an image capturing method employing the image sensor.

TECHNICAL BACKGROUND

Conventionally, an image capturing apparatus is provided with an image sensor to convert incident light to electric signals. Such the image sensor is capable of changing a conversion mode to the electric signals, based on intensity of the incident light. Concretely speaking, it is possible for such the image sensor to switchover the conversion mode between the linear conversion mode in which the incident light are linearly converted to the electric signals and the logarithmic conversion mode in which the incident light are logarithmically converted to the electric signals (for instance, set forth in Patent Document 1 and Patent Document 2).

According to the image sensor mentioned in the above, since the dynamic range of the electric signals can be widened, compared to that of another image sensor that can be operated only in the linear conversion mode, all of the luminance information can be represented by the electric signals, even when the subject to be captured has a wide luminance range.

In this connection, from the viewpoint for making the processing of the electric signals outputted from the image sensor easier, it is desirable that electric signals originated from a logarithmic conversion source (hereinafter, also referred to as electric signals of logarithmic conversion origin) are reconverted into those originated from a linear conversion source (hereinafter, also referred to as electric signals of linear conversion origin), so as to unify all of the concerned electric signals into those originated from the linear conversion source, and then, necessary processing are totally applied to the linearly-converted electric signals.

[Patent Document 1]

Tokkai 2002-77733, Japanese Non-Examined Patent Publication

[Patent Document 2]

Tokkai 2004-88312, Japanese Non-Examined Patent Publication

DISCLOSURE OF THE INVENTION

Summary of the Invention

To overcome the abovementioned drawbacks in conventional image-recording apparatus, it is one of objects of the present invention to provide an image capturing apparatus and an image capturing method, in which the electric signals originated from the logarithmic conversion source are converted into those originated from the linear conversion source and which makes it possible to prevent the upsizing trend of the apparatus.

Accordingly, at least one of objects of the present invention can be attained by the image capturing apparatus and the image capturing method described as follows.

(1) According to an image capturing apparatus reflecting an aspect of the present invention, the image capturing apparatus comprises: an image sensor that includes a plurality of pixels to convert incident light to first electric signals according to a plurality of photoelectronic conversion characteristics, based on intensity of the incident light; and a signal processing section to apply signal processing to the first electric signals; wherein the signal processing section includes: a linearization section to convert the first electric signals outputted from the image sensor to second electric signals, which represent such electric signals that are linearly converted from the incident light; and a compression section to compress a predetermined range component corresponding to a predetermined signal value range, among the first electric signals outputted from the image sensor.

(2) According to an image capturing method reflecting another aspect of the present invention, the image capturing method comprises: converting incident light to first electric signals according to a plurality of photoelectronic conversion characteristics, based on intensity of the incident light, by employing an image sensor that includes a plurality of pixels; and applying signal processing to the first electric signals; wherein the applying step includes: a linearizing process for converting the first electric signals outputted from the image sensor to second electric signals, which represent such electric signals that are linearly converted from the incident light; and a compression section to compress a predetermined range component corresponding to a predetermined signal value range, among the first electric signals outputted from the image sensor.

Embodiments will now be described, by way of example only, with reference to the accompanying drawings which are meant to be exemplary, not limiting, and wherein like elements are numbered alike in several Figures, in which.

Figure 3A:
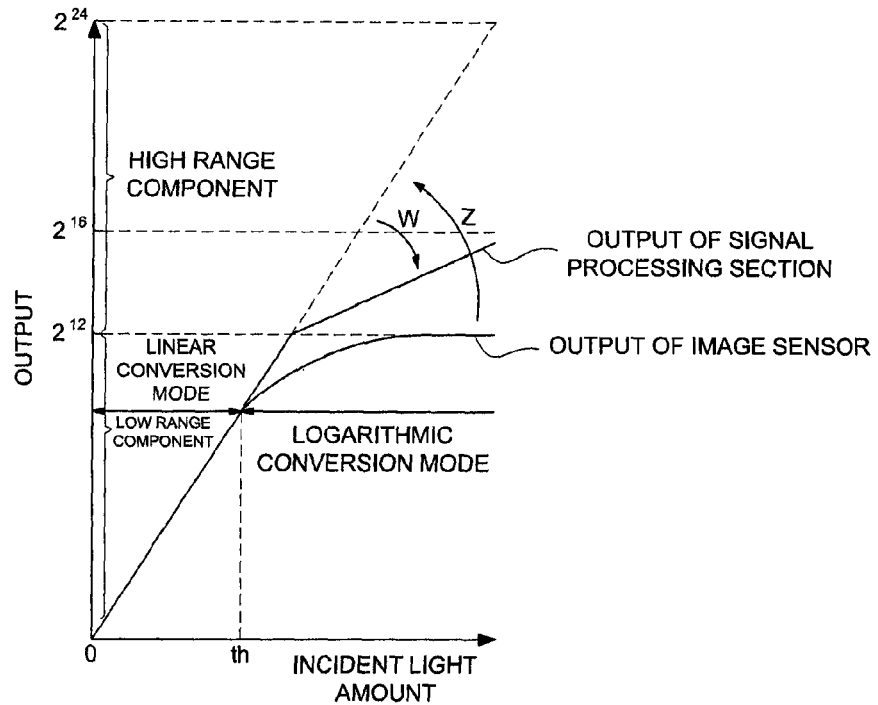
Figure 3B:
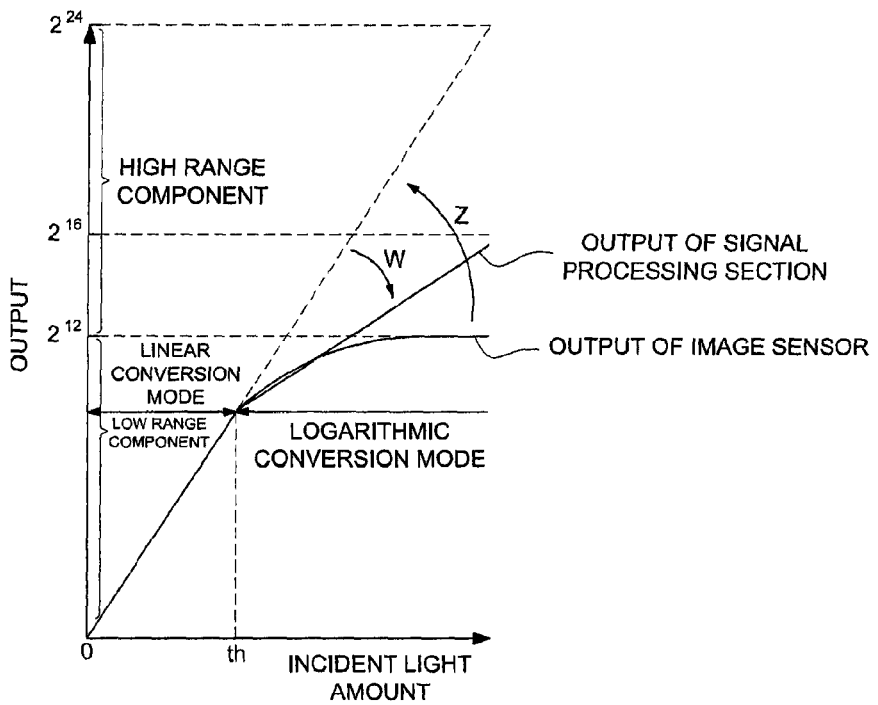
Figure 4:
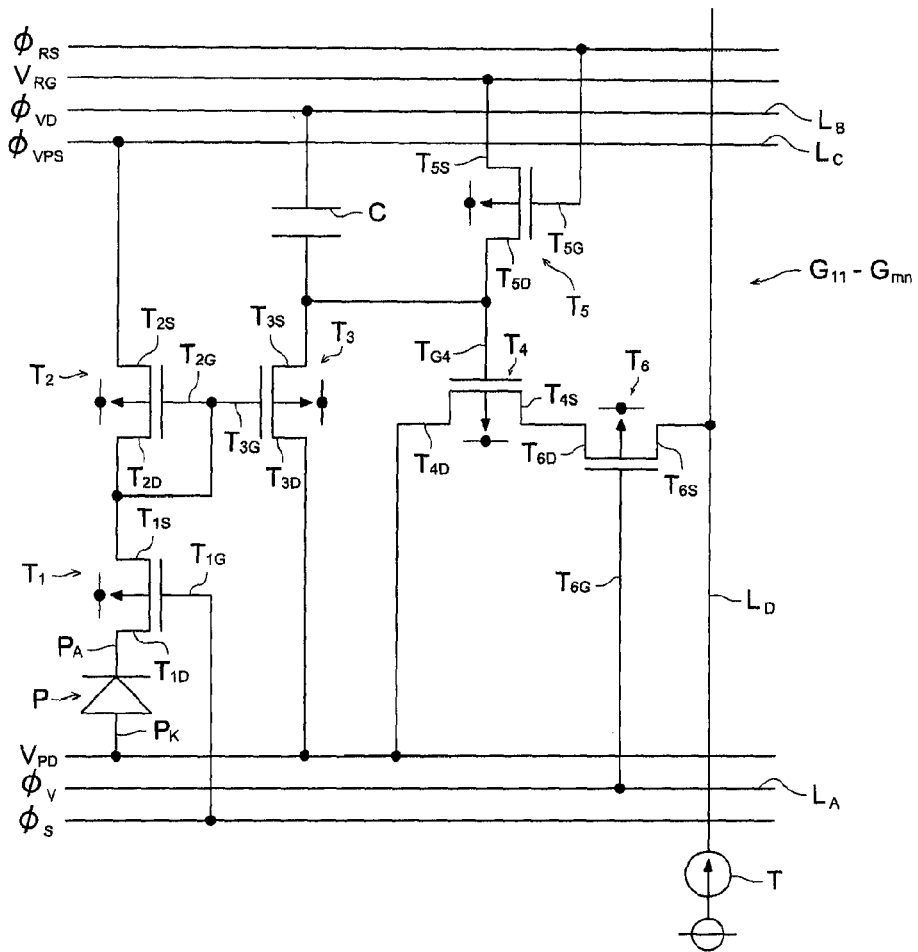
Figure 5:
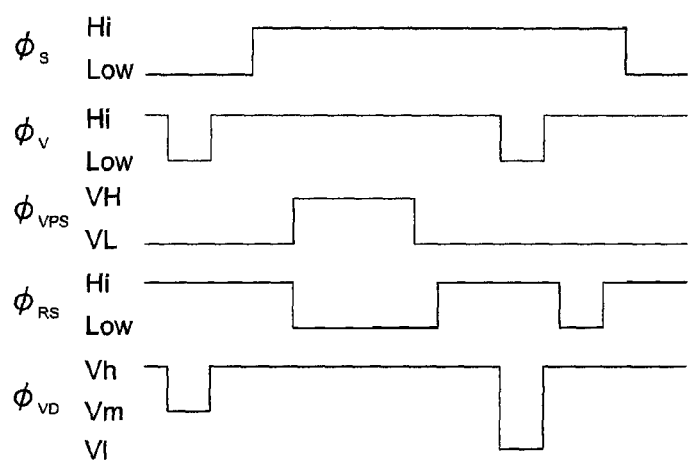
Figure 6:
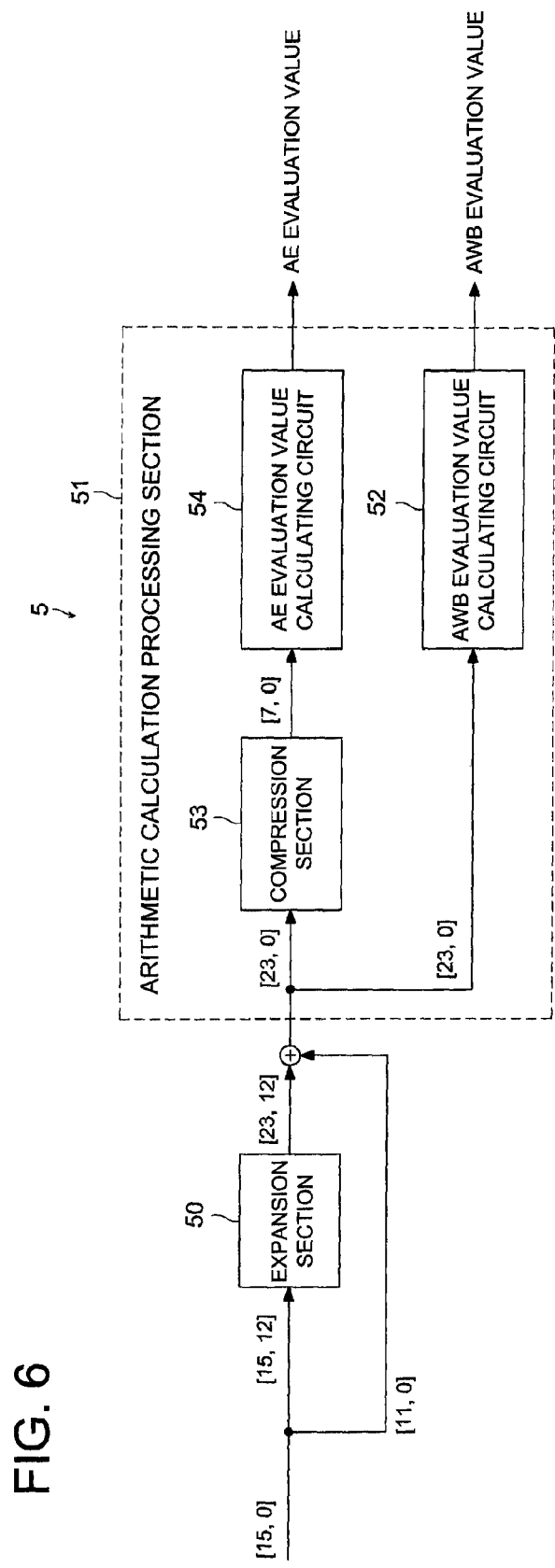
Figure 7:
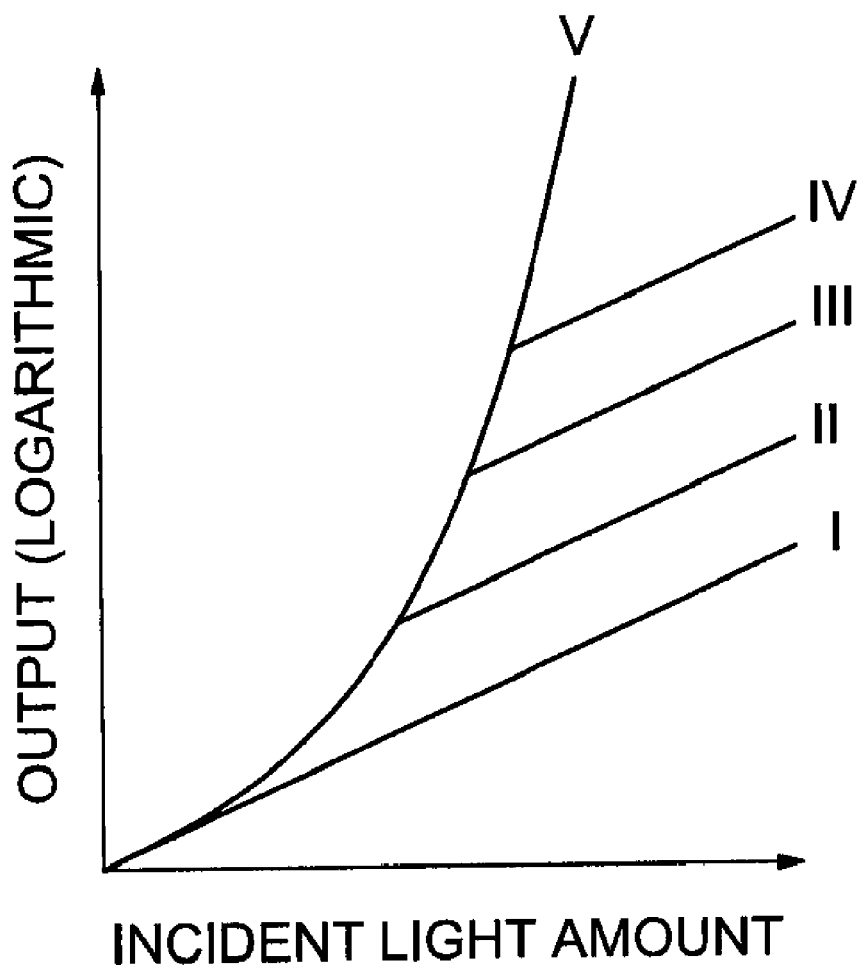
Figure 8:
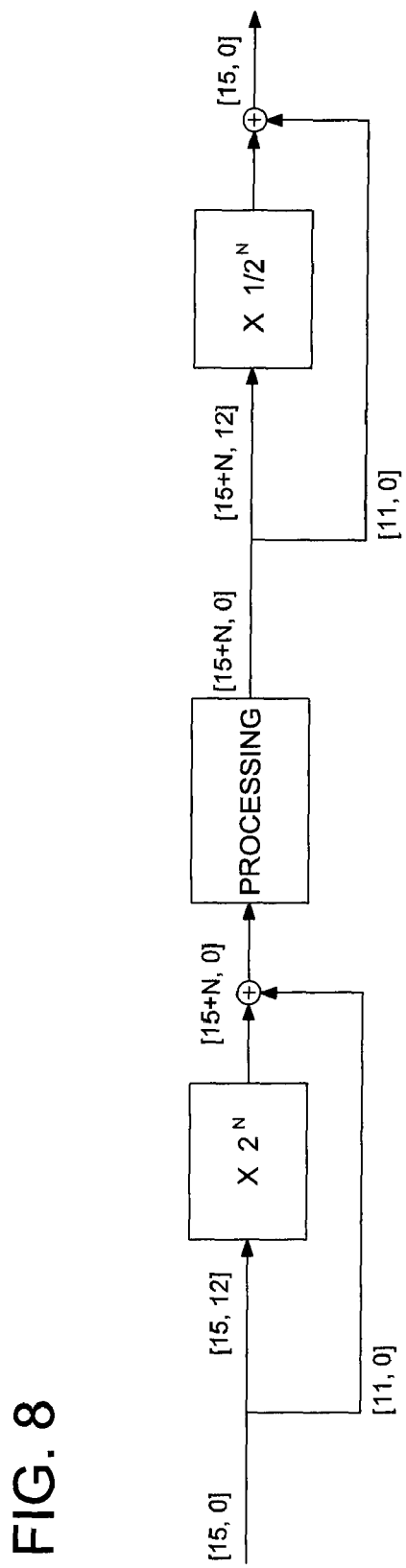
Figure 9:
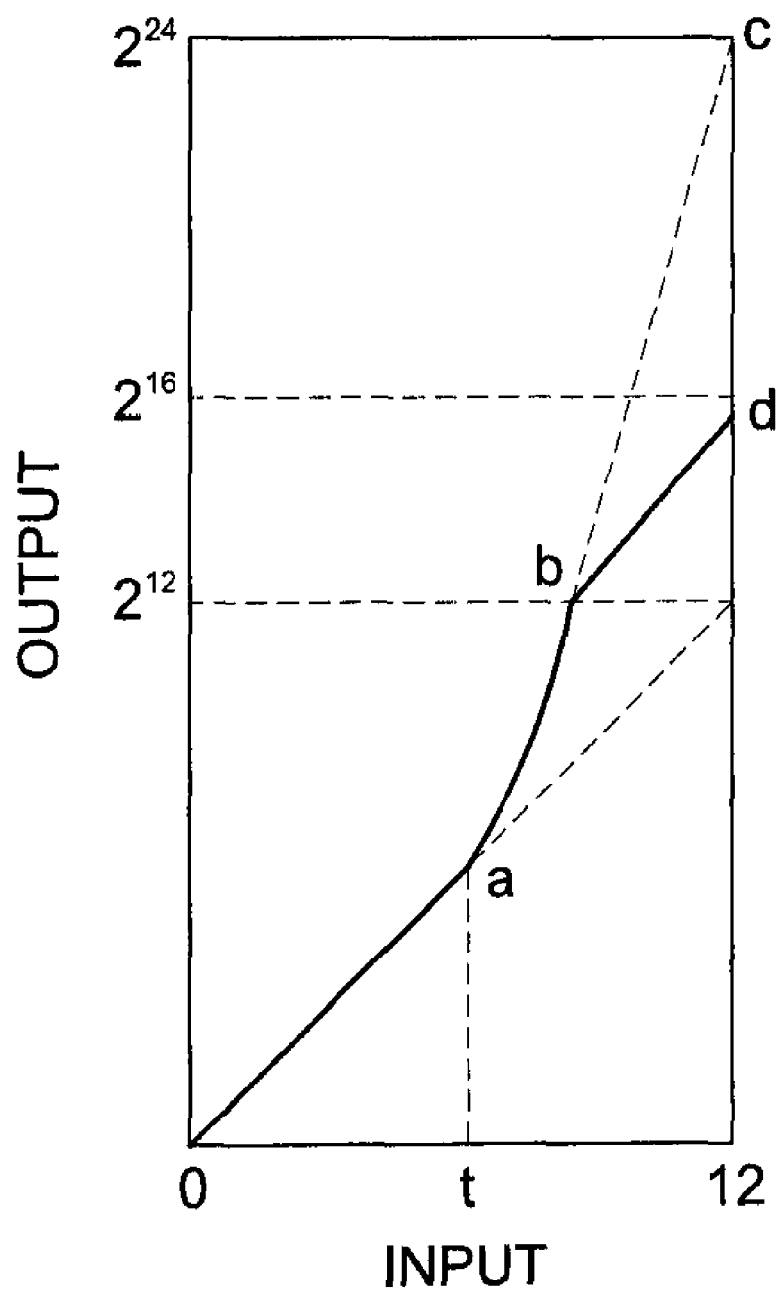

FIG. 3(a) and FIG. 3(b) are drawings for explaining operations of pixels and a signal processing section;

FIG. 4 shows a circuit diagram indicating a configuration of each pixel;

FIG. 5 shows a timing chart indicating an operation for resetting pixels;

FIG. 6 is a drawing for explaining operations of an evaluation value calculating section;

FIG. 7 is a drawing indicating a relationship between a difference of signal $\phi$vps and a conversion mode;

FIG. 8 is a drawing indicating a processing for signals outputted from a signal processing section; and FIG. 9 is a drawing indicating a Look Up Table.

BEST MODE FOR IMPLEMENTING THE INVENTION

Embodiment

Referring to the drawings, the embodiment of the present invention will be detailed in the following.

Figure 1:
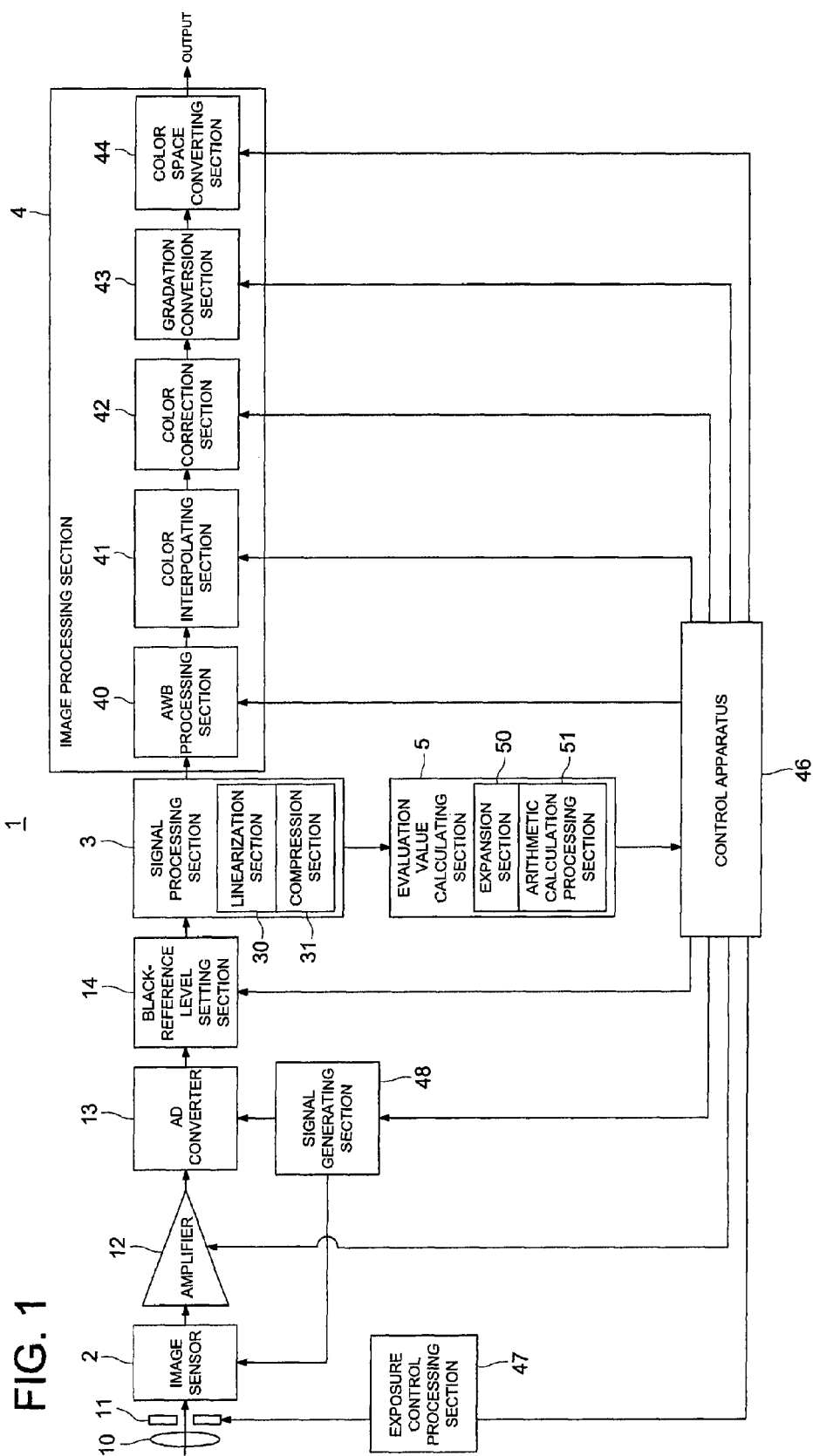
FIG. 1 shows a block diagram indicating a brief configuration of an image capturing apparatus embodied in the present invention.

FIG. 1 shows a block diagram indicating a brief configuration of an image capturing apparatus 1 embodied in the present invention.

As shown in FIG. 1, the image capturing apparatus 1 is provided with an image sensor 2 that receives incident light coming through a lens group 10 and an aperture 11. Conventionally available lenses and aperture element are employed as the lens group 10 and the aperture 11.

Figure 2:
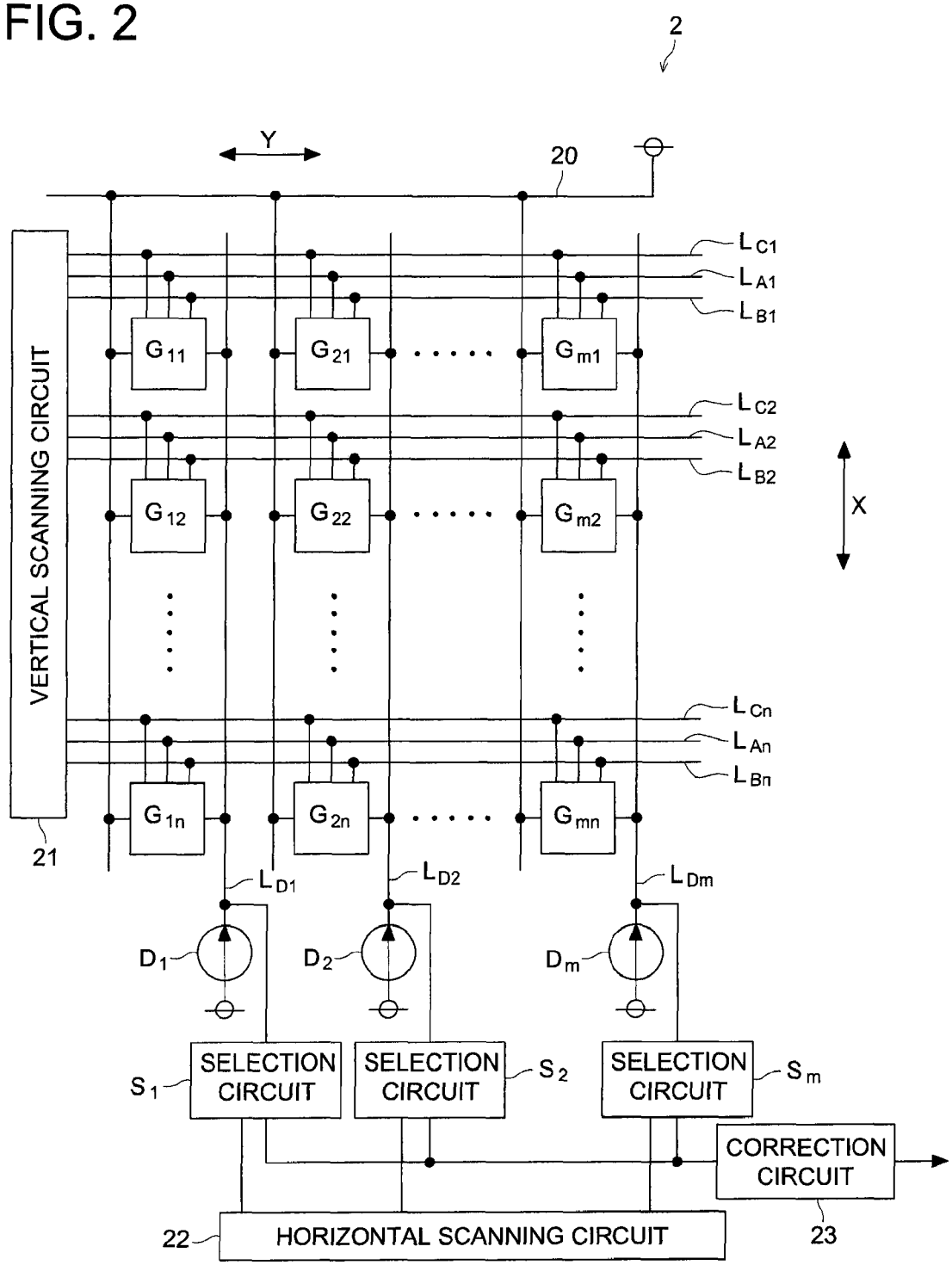
FIG. 2 shows a block diagram indicating a configuration of an image sensor.

As shown in FIG. 2, the image sensor 2 is provided with a plurality of pixels $G_{11}$-$G_{mn}$ (n, m: positive integer equal to or greater than 1), which are two-dimensionally aligned on a matrix plane.

Each of the plurality of pixels $G_{11}$-$G_{mn}$ performs an photo-electric converting action so as to output electric signals converted from incident light. Each of the pixels $G_{11}$-$G_{mn}$ is capable of changing a conversion mode to the electric signals, based on intensity of the incident light. Concretely speaking, it is possible for each of the pixels $G_{11}$-$G_{mn}$ to switchover the conversion mode between the linear conversion mode in which the incident light are linearly converted to the electric signals and the logarithmic conversion mode in which the incident light are logarithmically converted to the electric signals. In this embodiment, each of the pixels $G_{11}$-$G_{mn}$ conduct the linear conversion mode when intensity of the incident light currently received is smaller than a predetermined incident-light intensity th, while conduct the logarithmic conversion mode when intensity of the incident light currently received is equal to or greater than the predetermined incident-light intensity th, as shown in FIG. 3(a). Incidentally, hereinafter in the embodiment of the present invention, the term of "to linearly or logarithmically convert incident light into electric signals" is to linearly or logarithmically convert a time integral value of light amount into electric signals.

A unicolor filter (not shown in the drawings), serving as any one of a red filter, a green filter and a blue filter, is disposed on a surface of each of the pixels $G_{11}$-$G_{mn}$, opposing to the lens group 10. Further, as shown in FIG. 2, a power source line 20, signal applying lines $L_{A1}$-$L_{An}$, $L_{B1}$-$L_{Bn}$ and $L_{C1}$-$L_{Cn}$, signal reading lines $L_{D1}$-$L_{Dn}$ are coupled to the pixels $G_{11}$-$G_{mn}$, respectively. Still further, although other various kinds of lines, such as a clock line, a bias supplying line, etc., are also coupled to the pixels $G_{11}$-$G_{mn}$, respectively, such the lines are not shown in FIG. 2.

Signals $\phi_V$, $\phi_{VD}$, $\phi_{VPS}$ (refer to FIG. 4 and FIG. 5) are applied to each of the pixels $G_{11}$-$G_{mn}$, through the signal applying lines $L_{A1}$-$L_{An}$, $L_{B1}$-$L_{Bn}$ and $L_{C1}$-$L_{Cn}$. Further, the signal applying lines $L_{A1}$-$L_{An}$, $L_{B1}$-$L_{Bn}$ and $L_{C1}$-$L_{Cn}$ are coupled to a vertical scanning circuit 21. The vertical scanning circuit 21 applies the signals to the signal applying lines $L_{A1}$-$L_{An}$, $L_{B1}$-$L_{Bn}$ and $L_{C1}$-$L_{Cn}$, based on signals sent from a signal generating circuit 48 detailed later (refer to FIG. 1), while sequentially changing the objective signal lines onto which the current signal is to be applied, in the X direction shown in FIG. 2, among the signal applying lines $L_{A1}$-$L_{An}$, $L_{B1}$-$L_{Bn}$ and $L_{C1}$-$L_{Cn}$.

The electric signal generated in each of the pixels $G_{11}$-$G_{mn}$ is outputted onto the signal reading lines $L_{D1}$-$L_{Dn}$. Further, constant current sources $D_1$-$D_m$ and selection circuits $S_1$-$S_m$ are coupled to the signal reading lines $L_{D1}$-$L_{Dn}$.

A DC voltage $V_{PS}$ is applied to terminal ends (lower ends shown in FIG. 2) of the constant current sources $D_1$-$D_m$.

Each of the selection circuits $S_1$-$S_m$ samples and holds both a nose signal and an electric signal acquired in the image capturing operation, outputted from each of the pixels $G_{11}$-$G_{mn}$, through each of the signal reading lines $L_{D1}$-$L_{Dn}$. The selection circuits $S_1$-$S_m$ are coupled to a horizontal scanning circuit 22 and a correction circuit 23. The horizontal scanning circuit 22 sequentially changes the selection circuits $S_1$-$S_m$, each of which samples and holds the electric signal and transmits it to the correction circuit 23, in the Y direction shown in FIG. 2. Further, the correction circuit 23 removes the nose component from the electric signals concerned, based on the nose signals and the electric signals acquired in the image capturing operation, both of which are transmitted from the selection circuits $S_1$-$S_m$.

In this connection, the selection circuits and the correction circuit, both set forth in Tokkai 2001-223948 (Japanese Non-Examined Patent Publication), can be also employed as the selection circuits $S_1$-$S_m$ and the correction circuit 23 of the present embodiment, respectively. Further, although the following explanation is based on an assumption that only a single set of the correction circuit 23 is provided for the overall configuration of the selection circuits $S_1$-$S_m$, it is also applicable that plural correction circuits 23 are provided, so that each of the plural correction circuits 23 corresponds to each of the selection circuits $S_1$-$S_m$.

As shown in FIG. 1, the image sensor 2, an amplifier 12, an analogue-to-digital converter 13 (hereinafter, referred to as AD converter 13, for simplicity), a black-reference level setting section 14 and a signal processing section 3 are serially cascaded with each other in this order. Further, in this embodiment, the bit length of the digital signals to be outputted from the AD converter 13 is set at 12 bits, as shown in FIG. 3(a).

A role of the black-reference level setting section 14 is to establish the lowest level of the digital signals.

The signal processing section 3 is provided with a linearization section 30 and a compression section 31, so as to apply signal processing to the electric signals outputted from each of the pixels $G_{11}$-$G_{mn}$.

As shown in FIG. 3(a), a role of the linearization section 30 is to convert electric signals generated in the logarithmic conversion mode, among all of the electric signals outputted from the image sensor 2, into those generated in the linear conversion mode, namely those originated from a linear conversion source. In this connection, it is possible for the linearization section 30 to employ either a LUT (Look Up Table) or a calculation method, such as an exponential conversion method or the like, for conducting the abovementioned conversion processing. Further, in this embodiment, the total bit length of the digital signals processed in the linearization section 30 is set at 24 bits.

As shown in FIG. 3(a), a role of the compression section 31 is to compress a predetermined range component corresponding to a predetermined signal-value range among the electric signals outputted from the linearization section 30, namely, a high range component being equal to or greater than the bit length of the AD converter 13 in the present embodiment.

As shown in FIG. 1, an image processing section 4 is coupled to the signal processing section 3.

The processing section 4 is provided with an automatic white balance processing section 40 (hereinafter, referred to as AWB processing section 40, for simplicity), a color interpolating section 41, a color correction section 42, a gradation conversion section 43 and a color space converting section 44, so as to apply various kinds of image processing to the image data constituted by the overall electric signals outputted from the pixels $G_{11}$-$G_{mn}$. Succeeding to the signal processing section 3, the AWB processing section 40, the color interpolating section 41, the color correction section 42, the gradation conversion section 43 and the color space converting section 44 are serially cascaded in this order.

The AWB processing section 40 applies a white balance processing to the image data, while the color interpolating section 41 performs a color interpolating calculation with respect to a color of a specific pixel positioned in the vicinity of plural adjacent pixels to which filters having the same color are attached, based on electric signals outputted from the plural adjacent pixels. A role of the color correction section 42 is to correct a color appearance to be represented by the image data, and more specifically, to conduct the operation for correcting an electric signal of each color for every pixel, based on electric signals of other colors. The gradation conversion section 43 conducts gradation conversion processing of the image data, while the color space converting section 44 converts the RGB signals to the YCbCr signals.

Further, the signal processing section 3, an evaluation value calculating section 5 and a control apparatus 46 are serially cascaded with each other in this order.

The evaluation value calculating section 5 is provided with an expansion section 50 and an arithmetic calculation processing section 51.

As shown in FIG. 6, the expansion section 50 expands the high range component previously compressed by the compression section 31 of the signal processing section 3, so as to resume its original state before compressed. In this connection, the high range component outputted from the expansion section 50 after expanded and the low range component bypassing the expansion section 50 without being expanded are added to each other at the mid-point between the expansion section 50 and the arithmetic calculation processing section 51.

Further, the arithmetic calculation processing section 51 is provided with an AWB evaluation value calculating circuit 52, a compression section 53 and an AE evaluation value calculating circuit 54.

The AWB evaluation value calculating circuit 52 calculates an AWB evaluation value to be employed for the white balance processing (AWB processing) conducted in the AWB processing section 40. The compression section 53 compresses the electric signals, and, in this embodiment, employs the bit sift method so as to multiply the electric signals by $\frac{1}{2}^{12}$. The AE evaluation value calculating circuit 54 calculates an AE evaluation value to be employed for the exposure control processing (AE processing) conducted in an exposure control processing section 47.

The control apparatus 46 controls each of the sections incorporated in the image capturing apparatus 1. Accordingly, as shown in FIG. 1, the amplifier 12, the black-reference level setting section 14, the AWB processing section 40, the color interpolating section 41, the color correction section 42, the gradation conversion section 43 and the color space converting section 44, which are aforementioned, are coupled to the control apparatus 46. Further, the aperture 11 is also coupled to the control apparatus 46 through the exposure control processing section 47, while the image sensor 2 and the AD converter 13 are also coupled to the control apparatus 46 through a signal generating section 48.

Successively, the pixels $G_{11}$-$G_{mn}$ defined in the present embodiment will be detailed in the following.

As shown in FIG. 4, each of the pixels $G_{11}$-$G_{mn}$ is constituted by a photodiode P, transistors $T_1$-$T_6$ and a capacitor C. In this connection, the transistors $T_1$-$T_6$ are P channel MOS transistors.

The light passing through the lens group 10 and the aperture 11 is projected onto the photodiode P. A DC voltage $V_{PD}$ is applied onto a cathode $P_K$ of the photodiode P, while a drain $T_{1D}$ of the transistor $T_1$ is coupled to an anode $P_A$ of the photodiode P.

A signals $\phi_S$ is inputted into a gate $T_{1G}$ of the transistor $T_1$, while a gate $T_{2G}$ and a drain $T_{2D}$ of the transistor $T_2$ is coupled to a source $T_{1S}$ of the transistor $T_1$.

A source $T_{2S}$ of the transistor $T_2$ is coupled to a signal applying line $L_c$ (equivalent to the signal applying lines $L_{C1}$-$L_{Cn}$ shown in FIG. 2), so that the signal $\phi_{VPS}$ is inputted into the transistor $T_2$ from the signal applying line $L_c$. In this connection, as shown in FIG. 5, the signal $\phi_{VPS}$ is a binary voltage signal, and more specifically, the signal $\phi_{VPS}$ includes two voltage values, including a voltage value VL for operating the transistor $T_2$ in the sub-threshold region when an intensity of incident light exceeds the predetermined incident-light intensity th, and a voltage value VH for making the transistor $T_2$ act as ON-state (conductive state).

Further, a gate $T_{3G}$ of the transistors $T_3$ is coupled to the source $T_{1S}$ of the transistor $T_1$.

Still further, the DC voltage $V_{PD}$ is applied to a drain $T_{3D}$ of the transistors $T_3$. Yet further, a port of the capacitor C, a drain $T_{5D}$ of the transistors $T_5$ and a gate $T_{4G}$ of the transistors $T_4$ are coupled to a source $T_{3S}$ of the transistors $T_3$.

Another port of the capacitor C is coupled to a signal applying line $L_B$ (equivalent to the signal applying lines $L_{B1}$-$L_{Bn}$ shown in FIG. 2), so that the signal $\phi_{VD}$ is inputted into the transistors $T_2$ from the signal applying line $L_B$. In this connection, as shown in FIG. 5, the signal $\phi_{VD}$ is a ternary voltage signal, and more specifically, the signal $\phi_{VD}$ includes three voltage values, including a voltage value Vh to be employed when making the capacitor C conduct an integrating operation, a voltage value Vm to be employed when reading out the photo-electrically converted electric signals and a voltage value Vl to be employed when reading out the noise signals.

Further, a DC voltage $V_{RG}$ is applied to a source $T_{5S}$ of the transistor $T_5$ and a signals $\phi_{RS}$ is applied to a gate $T_{5G}$ of the transistor $T_5$.

Still further, the DC voltage $V_{PD}$ is applied to a drain $T_{4D}$ of the transistor $T_4$, as well as the drain $T_{3D}$ of the transistor $T_3$. Yet further, a drain $T_{6D}$ of the transistor $T_6$ is coupled to a source $T_{4S}$ of the transistor $T_4$.

The source $T_{6S}$ of the transistor $T_6$ is coupled to a signal reading line $L_D$ (equivalent to the signal reading lines $L_{D1}$-$L_{Dn}$ shown in FIG. 2), while the signal $\phi_V$ is inputted into a gate $T_{6G}$ of the transistor $T_6$ from the signal applying line $L_A$ (equivalent to the signal applying lines $L_{A1}$-$L_{An}$ shown in FIG. 2).

Successively, the pixels $G_{11}$-$G_{mn}$ and the operations of the vertical scanning circuit 21 will be detailed in the following.

At first, the vertical scanning circuit 21 conducts resetting operations of the pixels $G_{11}$-$G_{mn}$, as shown in FIG. 5.

Concretely speaking, the vertical scanning circuit 21 applies the pulse signal $\phi_V$, and the pulse signal $\phi_{VD}$ of the voltage value Vm onto the pixels $G_{11}$-$G_{mn}$ in the state that the signal $\phi_s$ is a low level (hereinafter, referred to as "L"), the signal $\phi_V$ is a high level (hereinafter, referred to as "H"), the signal $\phi_{VPS}$ is equal to voltage value VL, the signal $\phi_{RS}$ is "H" and the signal $\phi_{VPS}$ is equal to voltage value VL, so as to output the electric signals onto the signal reading lines $L_{D1}$-$L_{Dn}$. Then, the vertical scanning circuit 21 turns the signal $\phi_s$ to "H", so as to turn OFF the transistor $T_1$.

Next, the vertical scanning circuit 21 turns the signal $\phi_{VPS}$ to voltage value VL, so as to resume the original potential state of the transistor $T_2$, and then, turns the signal $\phi_{RS}$ to "H", so as to turn OFF the transistor $T_5$. Successively, the capacitor C performs the integrating action, so that the voltage at the connection node between the capacitor C and the gate $T_{4G}$ of the transistor $T_4$ corresponds to the gate voltage of the transistor $T_2$, which is currently reset.

Next, the vertical scanning circuit 21 applies the pulse signal $\phi_V$ to the gate $T_{6G}$ of the transistor $T_6$, to turn ON the transistor $T_6$, and, at the same time, applies the pulse signal $\phi_{VD}$ of the voltage value V1 to the capacitor C. On this occasion, since the transistor $T_4$ serves as a source follower of MOS transistor, the noise signals emerge on the signal reading line $L_D$ as voltage signals.

Successively, the vertical scanning circuit 21 applies the pulse signal $\phi_{RS}$ to the gate $T_{5G}$ of the transistor $T_5$, in order to reset the voltage at the connection node between the capacitor C and the gate $T_{4G}$ of the transistor $T_4$, and then, turns the signal $\phi_S$ to "L", so as to turn ON the transistor $T_1$. After that, the resetting operation is completed and the pixels $G_{11}$-$G_{mn}$ are enters in the state capable of capturing an image.

Next, the pixels $G_{11}$-$G_{mn}$ conduct the image capturing operations.

Concretely speaking, the photoelectronic charges, corresponding to the intensity of the incident light, flow into the transistor $T_2$ from the photodiode P and are accumulated into the gate $T_{2G}$ of the transistor $T_2$.

In this connection, since the transistor $T_2$ is in a cut-off state when the luminance of the subject is low, and the intensity of the incident light to be projected onto the photodiode P is smaller than the predetermined incident-light intensity th, the voltage, corresponding to the photoelectronic charges accumulated at the gate $T_{2G}$ of the transistor $T_2$, emerges at the gate $T_{2G}$. Accordingly, the voltage linearly converted from the incident light emerges at the gate $T_{3G}$ of the transistor $T_3$.

On the other hand, when the luminance of the subject is high, and the intensity of the incident light to be projected onto the photodiode P is greater than the predetermined incident-light intensity th, the transistor $T_2$ is operated in the sub-threshold region. Accordingly, the voltage natural-logarithmically converted from the incident light emerges at the gate $T_{3G}$ of the transistor $T_3$.

Incidentally, in the present embodiment, over all of the pixels $G_{11}$-$G_{mn}$, the predetermined incident-light intensity th is set at the same value.

When the voltage emerges on the gate $T_{3G}$ of the transistor $T_3$, the current flowing from the capacitor C to the drain $T_{3D}$ of the transistor $T_3$, is amplified corresponding to the above voltage. Therefore, the voltage either linearly or logarithmically converted from the incident light emerges on the gate $T_{4G}$ of the transistor $T_4$.

Successively, the vertical scanning circuit 21 sets the voltage value of the signal $\phi_{VD}$ at Vm, and, at the same time, turns the signal $\phi_V$ to "L". Then, the source current corresponding to the voltage on the gate $T_{4G}$ of the transistor $T_4$ flows onto the signal reading lines $L_D$ through the transistor $T_4$. On this occasion, since the transistor $T_4$ serves as a source follower of MOS transistor, the electric signals at the time of image capturing operation emerge on the signal reading line $L_D$ as voltage signals. In this connection, since the signal value of the electric signal outputted through the transistors $T_4$ and $T_6$ is in proportion to the gate voltage of the transistors $T_4$, the concerned voltage is such a voltage that is either linearly or logarithmically converted from the incident light projected onto the photodiode P.

Finally, the vertical scanning circuit 21 sets the signal $\phi_{VD}$ at Vh, and, at the same time, turns the signal $\phi_V$ to "H", so as to finalize the image capturing operation.

In this connection, when the pixels $G_{11}$-$G_{mn}$ are operated in the manner mentioned in the foregoing, the greater the difference between the voltage value VL and the reset voltage value VH becomes and/or the shorter the time interval from the completion of the resetting operation to the commencement of the image capturing operation becomes, the greater the potential difference between the gate $T_{2G}$ and the source $T_{2S}$ of the transistor $T_2$ becomes in order of "I" to "V" as shown in FIG. 7. In other words, the ratio of subject luminance for which the transistor $T_2$ is operated in its cutoff state, namely, the ratio of subject luminance to be linearly converted is getting large. Incidentally, the graph shown in FIG. 7 is the single logarithm graph, the vertical line of which is represented by the logarithmic value.

Accordingly, by varying the voltage values VL and VH of the signal $\phi_{VPS}$ and/or by varying the time interval from the completion of the resetting operation to the commencement of the image capturing operation, it becomes possible to control the conversion point serving as the border between the linear conversion mode and the logarithmic conversion mode, namely, the predetermined incident-light intensity th. Concretely speaking, for instance, by setting the voltage value VL at a low level so as to widen the luminance range in which the incident light is to be linearly converted, when the luminance range of the subject is narrow, or by setting the voltage values VL at a high level so as to widen the luminance range in which the incident light is to be logarithmically converted, when the luminance range of the subject is wide, it is possible to match the photoelectric conversion characteristics of the pixels $G_{11}$-$G_{mn}$ with the characteristics of the subject. Further, it is also possible to always place the pixels $G_{11}$-$G_{mn}$ on the linearly converting state when the voltage value VL is set at the minimum level (refer to "I" shown in FIG. 7), while it is also possible to always place the pixels $G_{11}$-$G_{mn}$ on the logarithmically converting state when the voltage value VL is set at the maximum level (refer to "V" shown in FIG. 7).

Successively, the image capturing method embodied in the present invention will be detailed in the following. In the following explanation, it is assumed that the incident light projected onto the pixels $G_{11}$-$G_{mn}$ is greater than the predetermined incident-light intensity th, and the image sensor 2 is operated in the logarithmic conversion mode.

At first, the image sensor 2 photo-electrically converts the incident light projected onto the pixels $G_{11}$-$G_{mn}$ to electric signals, and outputs the electric signals originated from the logarithmic conversion source as analogue signals (photoelectric conversion process). Concretely speaking, as described in the foregoing, when each of the pixels $G_{11}$-$G_{mn}$ outputs the electric signal onto the signal reading lines $L_D$, the constant current source D amplifies the electric signal, and then, the selection circuit S sequentially samples and holds the amplified electric signal. Further, when the sampled-and-held electric signal is inputted into the correction circuit 23 from the selection circuit S, the correction circuit 23 removes noises from the electric signals to output the processed electric signals.

Next, the amplifier 12 amplifies the analogue signals outputted from the image sensor 2, and then, the AD converter 13 converts the amplified analogue signals to the digital signals (analogue-to-digital conversion process).

Next, the black-reference level setting section 14 establishes the lowest level of the digital signals, and then, the signal processing section 3 conducts the signal processing (signal processing process). Concretely speaking, as indicated by the arrow Z shown in FIG. 3(a), the linearization section 30 converts the digital signals to linearized digital signals in a state of linear conversion origin (linearizing process). Further, as indicated by the arrow W shown in FIG. 3(a), the compression section 31 employs the bit sift method, in order to compress the component equal to or greater than the bit width of the AD converter 13, namely, the upper 12-bits component of the linearized digital signals, serving as the aforementioned high range component of the electric signals, to compressed component of 4-bits width by multiplying them by $\frac{1}{2}^8$ (compression process).

According to the above, the bit width of the digital signals to be processed in the following process, detailed later, becomes small, compared to the conventional method in which the compression process is not applied. Further, the compression process is made to be easier and the scale of the compression section 31 can be miniaturized, compared to the conventional case in which the high range component is compressed by employing a method being different from the bit sift method. Still further, being different from such the case that the compression processing is applied to the component equal to or greater than the signal value corresponding to the predetermined incident-light intensity th, the boarder point, between the non-compressed component and the compressed component among, for instance, electric signals, is kept constant.

Next, as shown in FIG. 6, the expansion section 50 of the evaluation value calculating section 5 expands the high range component compressed by the compression section 31 from 4-bits width to 12-bits width by employing the bit sift method (expanding process). Then, the expanded high range component is combined with the low range component, namely, the lower 12-bits width electric signals, so as to generate 24-bits width electric signals. As a result, the linear coefficient between the electric signals and the incident light is kept constant over the total range of the incident light.

Successively, based on the combined 24-bits width electric signals, the AWB evaluation value calculating circuit 52, the compression section 53 and the AE evaluation value calculating circuit 54, which are included in the arithmetic calculation processing section 51, calculates the AWB evaluation value and the AE evaluation value (arithmetic calculation process).

Then, based on the AE evaluation value, the control apparatus 46 controls the exposure control processing section 47 to adjust the exposure amount for the image sensor 2 (exposure control processing process).

Further, based on the AWB evaluation value, the lowest level established in the black-reference level setting section 14, etc., the control apparatus 46 controls the AWB processing section 40 to apply the white balance processing to the image data outputted from the signal processing section 3 (white balance processing process).

Still further, based on the image data outputted from the AWB processing section 40, the color interpolating section 41, the gradation conversion section 43 and the color space converting section 44 respectively conducts the image processing so as to output the processed image data.

According to the image capturing method mentioned in the foregoing, the linearizing process makes it possible to convert the electric signals originated from the logarithmic conversion source to those originated from the linear conversion source, and the compression process makes it possible to reduce the bit width of the digital signals to be processed in the image processing process, etc., after the compression process is completed. Accordingly, it becomes possible not only to convert the electric signals originated from the logarithmic conversion source to those originated from the linear conversion source, but also to prevent the image capturing apparatus 1 from upsizing.

Further, since it is possible the keep the boarder point between the non-compressed component and the compressed component constant, it becomes possible to make the various kinds of processing, such as the expanding process of the compressed electric signals, arithmetic calculation processing, etc., easy.

Still further, since the expanding process makes it possible to keep the linear coefficient between the electric signals and the incident light constant over the total range of the incident light, it becomes possible to apply the same processing to all of the expanded electric signals, being different from such the case that the linear coefficient varies. Accordingly, it becomes possible not only to make the processing to be applied in the arithmetic calculation process easy, but also to miniaturize the scale of the arithmetic calculation processing section 51.

In this connection, although it is assumed, in the embodiment described in the foregoing, that the AD converter 13, the linearization section 30 and the compression section 31 are cascaded in this order, it is also applicable that those are cascaded in other order. For instance, if the compression section 31, the linearization section 30 and the AD converter 13 were cascaded in this order, the compression process, the linearizing process and the analogue-to-digital conversion process would be conducted in the above order.

Further, although it is assumed, in the embodiment described in the foregoing, that the predetermined range component to be compressed by the compression section 31 of the signal processing section 3 is established as the component equal to or greater than the bit width of the AD converter 13, namely, the high range component of the upper 12-bits width, it is also applicable that the predetermined range component is established as the high range component equal to or greater than the signal value corresponding to the predetermined incident-light intensity th. Still further, it is also applicable that the predetermined range component is established as the predetermined low range component or the predetermined middle range component.

Still further, although, in the embodiment described in the foregoing, the electric signals, the high range component of which is compressed in the compression section 31 of the signal processing section 3, and then, expanded in the expansion section 50 of the evaluation value calculating section 5, are employed for the calculation processing of the AWB evaluation value and the AE evaluation value, it is also applicable that the concerned electric signals are used for other processing, and after that, the high range component is again compressed to output the electric signals, as shown in FIG. 8.

Still further, although it is assumed, in the embodiment described in the foregoing, that each of the pixels $G_{11}$-$G_{mn}$ has the circuit configuration shown in FIG. 4, it is also applicable that each of the pixels $G_{11}$-$G_{mn}$ has another circuit configuration, for instance, same as that indicated by the aforementioned Patent Document 1 (Tokkai 2002-77733, Japanese Non-Examined Patent Publication), as far as the switchover operation between the linear conversion mode and the logarithmic conversion mode is possible.

Yet further, although it is assumed, in the embodiment described in the foregoing, that the RGB filter is mounted on each of the pixels $G_{11}$-$G_{mn}$, it is needless to say that another color filter, such as a cyan filter, a magenta filter, a yellow filter, etc., can be employed for this purpose.

Modified Example of the Present Embodiment

Next, the modified example of the present embodiment will be detailed in the following. Incidentally, the same reference numbers as those in the aforementioned embodiment will be attached to the structural elements same as those shown in the aforementioned embodiment, and the explanations for them will be omitted.

The signal processing section 3 in the modified example is provided with a LUT (Look Up Table) shown in FIG. 9, instead of the linearization section 30 and the compression section 31.

Referring to the LUT, the signal processing section 3 linearly converts electric signals originated from the linear conversion source among the electric signals inputted from the image sensor 2 through the AD converter 13 and the black-reference level setting section 14, so as to output linearly-converted electric signals (line extended from the original point to point "a", shown in FIG. 9). Further, referring to the LUT, the signal processing section 3 logarithmically converts electric signals originated from the logarithmic conversion source among the inputted electric signals (line extended from point "a" to point "c", shown in FIG. 9). Still further, after the abovementioned logarithmic conversion is completed, the signal processing section 3 compresses the logarithmically-converted electric signal component, whose bit width is equal to or greater than that of the AD converter 13, by multiplying by $\frac{1}{2^8}$ (line extended from point "b" to point "d", shown in FIG. 9).

According to the modified example mentioned in the above, since both the linearizing process and the compression process can be achieved by employing the LUT, it becomes possible to miniaturize the scale of the signal processing section 3, compared to that in such a case that arithmetic calculation circuits are provided as the linearization section 30 and the compression section 31.

According to the present invention, the following effects can be attained.

(1) It becomes possible not only to convert the electric signals originated from the plurality of characteristic conversion sources into the state of linearly conversion origin, but also to prevent the image capturing apparatus from upsizing.

(2) It becomes possible not only to convert the electric signals originated from the linear conversion source into the state of linearly conversion origin, but also to prevent the image capturing apparatus from upsizing.

(3) It becomes possible not only to convert the electric signals originated from the logarithmic conversion source into the state of linearly conversion origin, but also to prevent the image capturing apparatus from upsizing.

(3) It becomes possible not only to convert the electric signals originated from the linear conversion sources and the logarithmic conversion source into the state of linearly conversion origin, but also to prevent the image capturing apparatus from upsizing.

(4) It becomes possible to make the processing for the electric signals after compressed easy.

(5) It becomes possible not only to make the compressing operation easy, but also to miniaturize the scale of the apparatus to be used for the compressing operation (compressing section), (6) It becomes possible to miniaturize the scale of the apparatus to be used for the signal processing operation (signal processing section).

(6) It becomes possible not only to make the arithmetic calculation processing to be conducted in the arithmetic calculation processing process easy, but also to miniaturize the scale of the apparatus to be used for the arithmetic calculation processing operation (arithmetic calculation processing section).

While the preferred embodiments of the present invention have been described using specific term, such description is for illustrative purpose only, and it is to be understood that changes and variations may be made without departing from the spirit and scope of the appended claims.

The invention claimed is:

1. An image capturing apparatus, comprising:
   an image sensor that includes a plurality of pixels to convert incident light to first electric signals according to a plurality of photoelectronic conversion characteristics, based on an intensity of the incident light; and
   a signal processing section to apply signal processing to the first electric signals;
   wherein the signal processing section includes:
   a linearization section to convert the first electric signals outputted from the image sensor to second electric signals, which represent such electric signals that are linearly converted from the incident light; and
   a compression section to compress a predetermined range component corresponding to a predetermined signal value range, among the first electric signals outputted from the image sensor;
   wherein the compression section compresses the predetermined range component to $\frac{1}{2^N}$ times; and
   wherein numeral N indicates a positive integer equal to or greater than 1.

2. The image capturing apparatus of claim 1, wherein the plurality of photoelectronic conversion characteristics are linear conversion characteristics.

3. The image capturing apparatus of claim 1, wherein the plurality of photoelectronic conversion characteristics are logarithmic conversion characteristics.

4. The image capturing apparatus of claim 1, wherein the plurality of photoelectronic conversion characteristics are linear conversion characteristics and logarithmic conversion characteristics.

5. The image capturing apparatus of claim 1, wherein the compression section compresses a high range component, which is equal to or greater than a predetermined signal value, among the first electric signals outputted from the image sensor, or among the second electric signals outputted from the linearization section.

6. The image capturing apparatus of claim 5, further comprising:
   an AD converter to convert the first electric signals outputted from the image sensor to first digital signals, wherein the first electric signals are analogue signals; and
   wherein the predetermined signal value is a maximum output value of the AD converter.

7. The image capturing apparatus of claim 1, wherein a linear conversion mode in which the incident light is linearly converted to the first electric signals and a logarithmic conversion mode in which the incident light is logarithmically converted to the first electric signals are switched to each other, based on the intensity of the incident light, in the image sensor; and
   wherein the linearization section converts the first electric signals generated in the logarithmic conversion mode to the second electric signals, which represent such electric signals that are linearly converted from the incident light.

8. The image capturing apparatus of claim 1, wherein the compression section compresses the predetermined range component so that a linear conversion coefficient between the incident light and expanded electric signals, which are acquired by expanding a compressed predetermined-range component to $2^N$ times, is kept constant all over a variable range of the intensity of the incident light; and
   wherein numeral N indicates a positive integer equal to or greater than 1.

9. The image capturing apparatus of claim 1, wherein the compression section compresses the predetermined range component by employing a bit shift method.

10. The image capturing apparatus of claim 1, wherein the signal processing section is provided with a Look Up Table, serving as the linearization section and the compression section, which is employed for converting the first electric signals outputted from the image sensor to the second electric signals, which represent such electric signals that are linearly converted from the incident light; and
    wherein the signal processing section compresses the predetermined range component of the electric signals.

11. The image capturing apparatus of claim 1, further comprising:
    an expansion section, coupled to the signal processing section, to expand the predetermined range component compressed by the compression section so as to convert them into a state before compressed; and an arithmetic calculation processing section, coupled to the expansion section, to apply arithmetic calculation processing to third electric signals outputted from the expansion section.

12. The image capturing apparatus of claim 11, wherein the expansion section employs a bit shift method to expand the predetermined range component, compressed by the compression section, to $2^N$ times; and wherein numeral N indicates a positive integer equal to or greater than 1.

13. The image capturing apparatus of claim 11, further comprising:

an exposure control processing section to adjust an exposure amount for the image sensor, based on a calculating result of the arithmetic calculation processing section.

14. The image capturing apparatus of claim 11, further comprising:

a white balance processing section to conduct a white balance processing of a captured image, based on a calculating result of the arithmetic calculation processing section.

15. An image capturing method, comprising:

converting incident light to first electric signals according to a plurality of photoelectronic conversion characteristics, based on an intensity of the incident light, by employing an image sensor that includes a plurality of pixels; and applying signal processing to the first electric signals;

wherein the applying step includes:

a linearizing process for converting the first electric signals outputted from the image sensor to second electric signals, which represent such electric signals that are linearly converted from the incident light; and a compressing process to compress a predetermined range component corresponding to a predetermined signal value range, among the first electric signals outputted from the image sensor;

wherein the predetermined range component is compressed to $1/2^N$ times in the compressing process; and wherein numeral N indicates a positive integer equal to or greater than 1.

16. The image capturing method of claim 15, wherein the plurality of photoelectronic conversion characteristics are linear conversion characteristics.

17. The image capturing method of claim 15, wherein the plurality of photoelectronic conversion characteristics are logarithmic conversion characteristics.

18. The image capturing method of claim 15, wherein the plurality of photoelectronic conversion characteristics are linear conversion characteristics and logarithmic conversion characteristics.

19. The image capturing method of claim 15, wherein a high range component, which is equal to or greater than a predetermined signal value, among the first electric signals outputted from the image sensor, or among the second electric signals outputted from the linearization section, is compressed in the compressing process.

20. The image capturing method of claim 19, further comprising:

converting the first electric signals outputted from the image sensor to first digital signals by employing an AD converter, wherein the first electric signals are analogue signals; and wherein a maximum output value of the AD converter is used as the predetermined signal value in the compressing process.

21. The image capturing method of claim 15, wherein a linear conversion mode in which the incident light is linearly converted to the first electric signals and a logarithmic conversion mode in which the incident light is logarithmically converted to the first electric signals are switched to each other, based on the intensity of the incident light, in the image sensor; and wherein, in the linearizing process, the first electric signals generated in the logarithmic conversion mode are converted to the second electric signals, which represent such electric signals that are linearly converted from the incident light.

22. The image capturing method, of claim 15, wherein the predetermined range component is compressed, so that a linear conversion coefficient between the incident light and expanded electric signals, which are acquired by expanding a compressed predetermined-range component to $2^N$ times, is kept constant all over a variable range of the intensity of the incident light; and wherein numeral N indicates a positive integer equal to or greater than 1.

23. The image capturing method of claim 15, wherein the predetermined range component is compressed by employing a bit shift method in the compressing process.

24. The image capturing method of claim 15, wherein the linearizing process is conducted in the applying step by employing a Look Up Table, which is employed for converting the first electric signals outputted from the image sensor to the second electric signals, which represent such electric signals that are linearly converted from the incident light; and wherein a predetermined range component of the second electric signals are compressed in the applying step by employing another Look Up Table, which is employed for compressing the predetermined range component of the second electric signals.

25. The image capturing method of claim 15, further comprising:

expanding the predetermined range component compressed in the compressing section so as to convert them into a state before compressed; and applying arithmetic calculation processing to third electric signals expanded in the expanding step.

26. The image capturing method of claim 25, wherein the predetermined range component, compressed in the compressing process, is expanded to $2^N$ times, by employing a bit shift method in the expanding step; and wherein numeral N indicates a positive integer equal to or greater than 1.

27. The image capturing method of claim 25, further comprising:

adjusting an exposure amount for the image sensor, based on a calculating result calculated in the step of applying arithmetic calculation processing.

28. The image capturing method of claim 25, further comprising:

conducting a white balance processing of a captured image, based on a calculating result calculated in the step of applying arithmetic calculation processing.

* * * * *